(12) United States Patent
Guyette

(10) Patent No.: US 7,373,635 B2
(45) Date of Patent: May 13, 2008

(54) SYSTEM AND METHOD FOR EFFICIENT DEVELOPMENT OF CONFIGURABLE SOFTWARE SYSTEMS IN A LARGE SOFTWARE DEVELOPMENT COMMUNITY

(75) Inventor: Thomas Michael Guyette, North Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 10/736,065

(22) Filed: Dec. 15, 2003

(65) Prior Publication Data

US 2005/0132324 A1    Jun. 16, 2005

(51) Int. Cl.
*G06F 9/44* (2006.01)
*G06F 17/00* (2006.01)

(52) U.S. Cl. .................. 717/120; 717/101; 717/102; 706/45; 706/47

(58) Field of Classification Search ........ 717/100–103, 717/120–123; 706/45–48, 50, 55, 59–61
See application file for complete search history.

(56) References Cited

U.S. PATENT DOCUMENTS

| | | | | |
|---|---|---|---|---|
| 5,063,522 A | * | 11/1991 | Winters ..................... | 706/10 |
| 5,644,686 A | * | 7/1997 | Hekmatpour ................ | 706/45 |
| 5,960,419 A | * | 9/1999 | Fagg et al. .................. | 706/59 |
| 6,018,627 A | * | 1/2000 | Iyengar et al. .............. | 717/103 |
| 6,236,994 B1 | * | 5/2001 | Swartz et al. ................ | 707/6 |
| 6,405,364 B1 | * | 6/2002 | Bowman-Amuah ......... | 717/101 |
| 6,615,258 B1 | * | 9/2003 | Barry et al. ................ | 709/223 |
| 6,631,361 B1 | * | 10/2003 | O'Flaherty et al. ........... | 706/47 |
| 6,643,660 B1 | * | 11/2003 | Miller et al. ................ | 707/100 |
| 6,725,447 B1 | * | 4/2004 | Gilman et al. .............. | 717/105 |
| 6,871,340 B1 | * | 3/2005 | Gillis ........................ | 717/100 |
| 6,877,153 B2 | * | 4/2005 | Konnersman ............... | 717/100 |
| 7,065,745 B2 | * | 6/2006 | Chan .......................... | 717/117 |
| 7,171,585 B2 | * | 1/2007 | Gail et al. .................... | 714/25 |

OTHER PUBLICATIONS

Whitley, Edgar A., "Expert Systems: True support for the process of decision making," 1990, ACM, p. 123-140.*
Walz et al., "Inside a software design team: knowledge acquisition, sharing, and integration," 1993, ACM, p. 63-77.*
Ran et al., "Design Decision Trees," 1996, IEEE, p. 172-175.*

* cited by examiner

*Primary Examiner*—Wei Zhen
*Assistant Examiner*—Qing Chen
(74) *Attorney, Agent, or Firm*—David A. Dagg

(57) ABSTRACT

An automated software process for acquiring and distributing information regarding design guidelines relevant to developers of a software system. The system supports developer decisions regarding design guidelines for operational characteristics, such as "points of variability" (POV), of a system under development. Operational characteristics of the system under development are "profiled" through answers to questions reflecting the high level system design. The collected answers indicate a category of operational characteristics associated with a design guideline. A developer obtains the design guidelines appropriate for a given operational characteristic when the answers entered by the developer with regard to that operational characteristic are used to determine one of the elements in the category array. Technical leadership establishes a high-level system design, and determines questions leading to design guidelines for categories of operational characteristics of the system. The design guidelines may then be conveniently accessed by the developer.

1 Claim, 5 Drawing Sheets

| | |
|---|---|
| SAME FOR ALL USERS<br><br>SAME FOR ALL LOCATIONS<br><br>82 | DIFFERENT FOR EACH USER<br><br>SAME FOR ALL LOCATIONS<br><br>84 |
| SAME FOR ALL USERS<br><br>DIFFERENT FOR EACH LOCATION<br><br>86 | DIFFERENT FOR EACH USER<br><br>DIFFERENT FOR EACH LOCATION<br><br>88 |

CATEGORY ARRAY
80

SYSTEM AND METHOD FOR EFFICIENT DEVELOPMENT OF CONFIGURABLE SOFTWARE SYSTEMS IN A LARGE SOFTWARE DEVELOPMENT COMMUNITY

FIELD OF THE INVENTION

The present invention relates generally to software development systems, and more specifically to increasing decision-making efficiency in large-scale software development projects.

BACKGROUND OF THE INVENTION

In software development communities made up of large numbers of software developers, it is frequently difficult to communicate relevant architectural decisions to developers at times when such information is needed. Specifically, when a developer is ready to develop or significantly modify a program code component, he or she needs immediate assistance in making myriad design decisions according to standards established for the project. Such assistance must either be sought by searching through a potentially large, unwieldy, and potentially out-of-date body of project documents, or from team leadership, who can be bottlenecks to getting an answer quickly. Existing systems for code management in the development process have not addressed this problem adequately.

A common example is the developer faced with choosing where to store persistent settings for "points of variability" ("POV data"), such as configuration values, application assembly values, and the like, for a component s/he is developing. Guidance on where and how to store POV data (and the "where-and-how" of other project standards) can be difficult to find, and when the system under development is relatively complex, there are often many different places to store such POV data. Although the design and development process gradually reveals what the POV for a component should be, making the right decision about where to store POV data is not always obvious.

Several undesirable consequences may result from this situation. First, different developers may each independently make their own determinations as to where POV data should be stored. This likely leads to a proliferation of disparate, disconnected data stores (e.g., separate text files, relational data stores, etc.) across the system. Second, developers may choose to use existing data stores that have inappropriate characteristics for the specific data to be stored. For example, a poorly chosen store might not be available to the component in certain use cases, or may not be translatable to all supported languages, etc. Developers could spend large amounts of development time learning the characteristics of all data stores just so they can make an informed decision about where to store the POV data for the components they develop.

None of these consequences are desirable, and each may result in bad design decisions that must be fixed and re-written, and, in the case where the product has already been shipped and installed in live production, migrated from one POV data store to another as storage decisions are re-made in newer versions of the product.

For the above reasons and others, it would be desirable to have a new system for software system development that provides a convenient way for developers to access "development guide" information reflecting architectural decisions about a system under development in a just-in-time fashion—that is, when they need such information to make specific design decisions about their component. Such a system would be applicable to providing convenient, clear, on-demand guidance in determining storage locations for storing POV data, and to making other component design decisions not related to POV data value storage.

SUMMARY OF THE INVENTION

To address the problems described above and others, a system and method are disclosed that provide an automated software process for acquiring, representing, and distributing information to software developers regarding software system architectural decisions. Using the disclosed system, a development team follows a series of well-defined steps to establish standards for implementation of components in the system. Information about project standards flows from the architects, who determine overall system characteristics and general component needs, into a profiling system that can later be used by developers to assist in making implementation decisions.

The disclosed system c-an be used to facilitate developer decisions regarding storage of operational characteristics, such as POV data, by a component under development, using consistent, deterministic project guidelines. During operation of the disclosed system, the POV needs of the component under development are "profiled" by obtaining answers to a series of questions relevant to the high level system design. For example, the flowchart of questions for a given POV data value may be presented to a developer within a graphical user interface (GUI) presented by the disclosed system. The collected answers to the questions lead the developer to a "node" that can be represented as an element in a category array having dimensions equal in number to the number of questions. For example, a decision tree with two questions, each having two possible answers, translates into a two-dimensional category array with four array elements; a decision tree with three questions, each having two possible answers, translates into a three-dimensional category array with eight array elements, etc. Each element of the category array represents a category of POV data, and contains one or more associated design guidelines. During operation of the disclosed system, a developer obtains the design guidelines appropriate for a given piece of POV data when the answers entered by the developer with regard to that POV data value are used to identify one of the elements in the category array. For example, a design guideline for one of the array elements in the category array may indicate that POV data with that element's characteristics should be stored in a text file on the local hard drive, while another array element may indicate the POV data should be stored using a reusable user preference storage component developed by the system team.

In order to set up and use the disclosed system in the context of developing a specific software system, a series of steps is followed. First, the technical leadership team for the project establishes high-level system design requirements. Next, based on these requirements, the technical leadership determines questions leading to design guidelines for categories of POV data of the system. The design guidelines may then be accessed by the developer, or automatically associated with a program component under development as indicated by the answers provided by a developer.

Thus there is disclosed a new system for software system development that provides a convenient way for developers to access information reflecting architectural decisions about a program. The disclosed system enables a developer to obtain design guidelines based on the system design when such information is needed during the development process. The disclosed system would further be applicable to providing convenient developer access to information relevant to determining storage locations for POV data of the system under development, such as configuration values.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
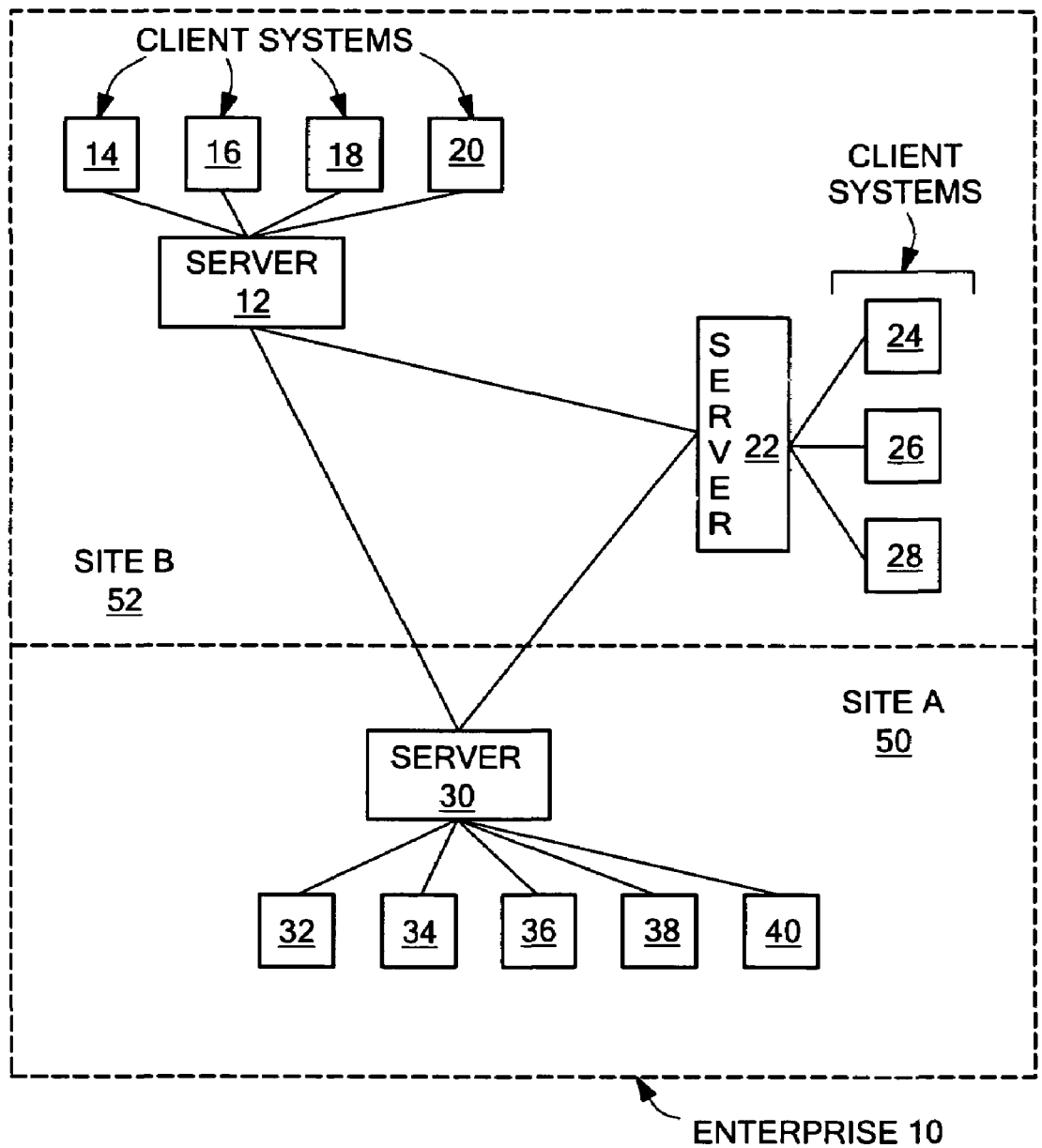
FIG. 1 is a block diagram illustrating a topology for a software system under development, shown as a distributed software application.

Many software programs are designed for coordinated operation across multiple computer systems, and are sometimes described as "distributed" or "enterprise" programs or applications. FIG. 1 illustrates the execution environment of a client-server enterprise application program, for the purpose of describing how the disclosed system can be used to facilitate good software developer design decisions, in particular during development of such distributed software systems.

As shown in FIG. 1, a software program under development may, for example, consist of an enterprise application program that can be accessed from, or executed on, multiple computer systems in a networked computer environment. As shown in FIG. 1, an enterprise 10 includes a site A 50 having a server system 30 and associated client systems 32, 34, 36, 38 and 40, some of which may be shared among multiple users. A site B 52 is shown having a server system 12 and associated client systems 14, 16, 18 and 20, and a server system 22 and associated client systems 24, 26 and 28. The server and client systems in FIG. 1 are connected through a communications network. The server and client systems of FIG. 1 may each, for example, include one or more processors and associated program code storage, such as program memory, as well as various input/output (I/O) devices or interfaces. A distributed software program may include components distributed among and executing on some or all of the server and client systems shown in the enterprise 10. Accordingly, operational characteristics, such as, for example, POV data of a software program distributed across the server and client systems of the enterprise 10, might similarly be distributed across such multiple, separate computer systems.

During development of a distributed software application operable across the systems shown in the enterprise 10 of FIG. 1, software developers are faced with a variety of decisions regarding POV data of the software components they develop. For example, a developer may be faced with deciding where and/or how certain POV data, such as configuration values, application assembly values, and the like should be stored. Examples of configuration values in distributed programs include user buddy lists for chat applications, various user settings for word processing applications, individual user and shared lists or groups for electronic mail systems, and system configuration values defining security policies, resource allocation, and/or many other system configuration parameters.

As will be evident to those skilled in the art, individual POV data values may be user-related values relevant to some or all users, or system-related values relevant to some or all systems. For example, a given user POV data value may be relevant to all users, only users associated with one or more designated server or client systems, or relevant only to an individual user. Similarly, a system configuration value may be relevant to all server and client systems, only certain designated server or client systems, or only an to an individual client or server system. Accordingly, the data store for a POV should be selected in a way that is consistent with the attributes of that piece of POV data. When the software system under development is a distributed software application capable of having components executing on distributed server and client systems, such as those client and server systems shown in the enterprise 10 of FIG. 1, multiple data stores may be defined for storage of configuration values. Such configuration value data stores may each be designed for storage of certain types or categories of configuration values within the system under development. The number of different data stores used for storing configuration values in a distributed software program operating across multiple client and server systems may be relatively large. Accordingly, a developer of a software component for a complex, distributed software program often faces a difficult task when determining the appropriate data store to be used for storing a given configuration value.

The disclosed system may be embodied to determine a data store in which a given POV data value should be stored for use by a distributed software component under development. The disclosed system issues a number of questions to a software developer regarding a specific piece of POV data that the developer is interested in determining a data store for. The answers provided by the developer to these questions result in a profile for the piece of POV data. The profile is used by the disclosed system to determine one or more design guidelines for the profiled piece of POV data. For example, in the case of a POV data value consisting of a configuration value, an embodiment of the disclosed system may be used to determine a design guideline consisting of an appropriate data store for the configuration value. In such an embodiment, the data store determined for the configuration value may include any specific type of data storage or data storage location for the configuration value, including but not limited to, any specific type or location of one or more data structures, such as files, databases, text documents, etc. Moreover, an embodiment of the disclosed system may operate to provide design guidelines for storing configuration values in different categories within a shared data store by associating meta-data tags with the configuration values. In this context, the term "meta-data" is used to refer to any specific type of data used to describe the properties of other data. In this case, the meta-data is used to describe and distinguish one or more categories of configuration values sharing a common data store.

Figure 2:
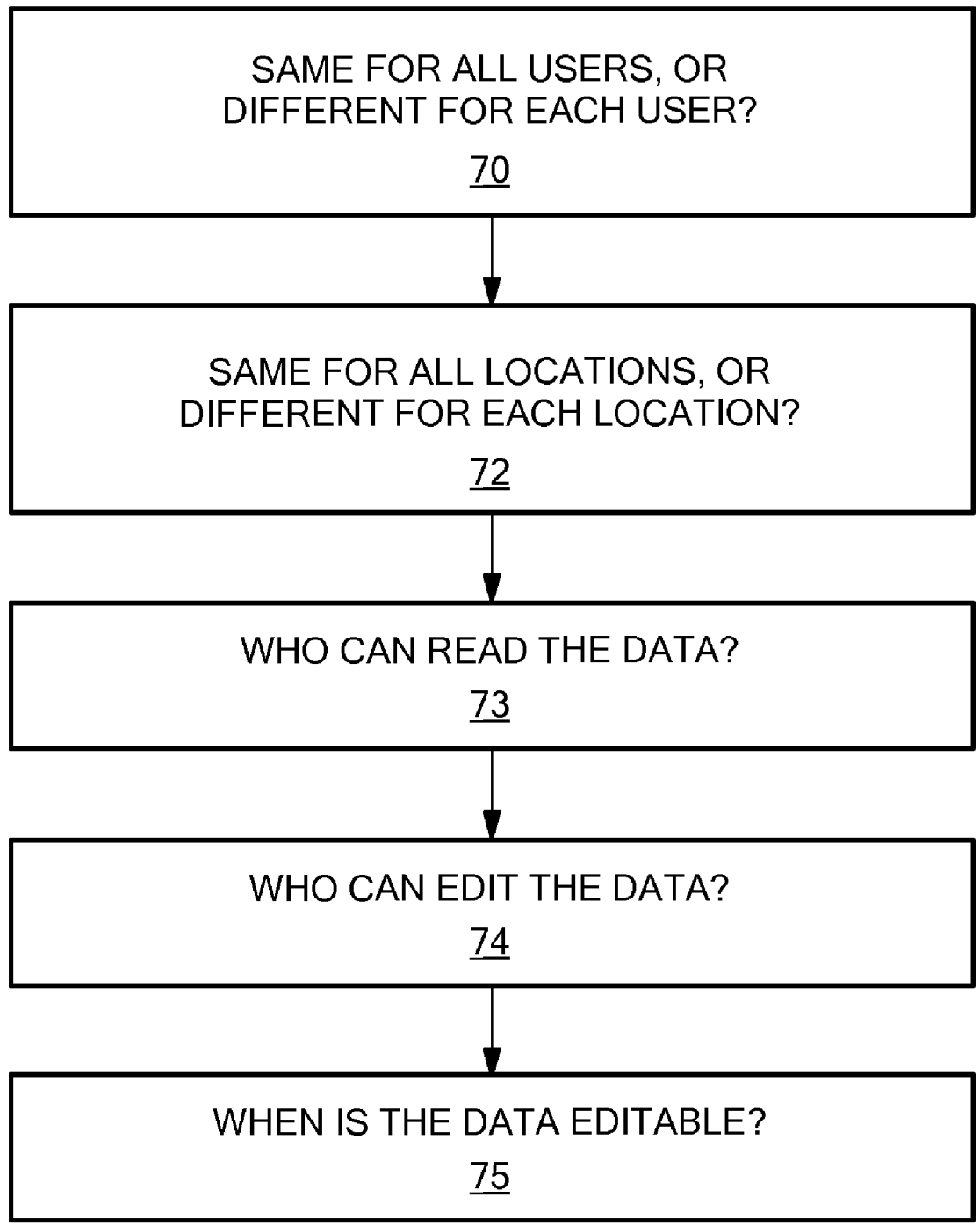
FIG. 2 is a flow chart diagram illustrating questions provided during operation of an embodiment of the disclosed system to obtain a profile for a POV of a system under development.

FIG. 2 illustrates a flow of questions provided by an embodiment of the disclosed system to determine a profile for an POV data value consisting of a configuration value. The questions described by the FIG. 2 flow may be provided through any appropriate graphical user interface (GUI) on a user computer system. Similarly, the answers to the questions described by the FIG. 2 flow may be obtained through any appropriate graphical user interface. Those skilled in the art will recognize that the order of the questions in FIG. 2 is for purposes of explanation only, and that any question order may be used. Similarly, the specific questions in FIG. 2 are also given only for purposes of explanation, and the specific questions provided in different embodiments may vary, depending on the overall requirements and system design of the system under development.

At step 70 of the embodiment shown in FIG. 2, the disclosed system displays a question to the user as to whether the configuration value is to be maintained as the same value for all users of the system under development, or as a different value for each user. The disclosed system captures the answer provided by the user to the question of step 70, and at step 72 displays a question to the user as to whether the configuration value is to be maintained as the same value for all locations over which the system under development is deployed, or is to be maintained separately in each location. After capturing the answer to the question of step 72, the disclosed system displays a question at step 73 to determine who is to be allowed to read the configuration value. The answer to the question of step 73 is then captured, and the disclosed system displays a question at step 74 to determine who is to be permitted to edit the configuration value, and captures the answer to that question. The disclosed system then operates to display a question to determine when the configuration value is to be editable at step 75, and captures the answer to that question. Thus, as shown for purposes of explanation in FIG. 2, the disclosed system may be embodied to determine whether a given POV data value is the same for all users or different for each user, whether the POV data value is the same in all locations or different for different locations, which users are permitted to read and/or edit the POV data value, and whether the POV data value should be modifiable at development time, installation time, and/or runtime. Questions provided by the disclosed system, such as those shown for purposes of explanation in FIG. 2, are system-specific, and determined by technical leadership.

Figure 3:
FIG. 3 is an illustration of a category array in an embodiment of the disclosed system.

After capturing the user's answers to a set of profiling questions relating to a POV data value of the system under development, such as the questions shown in the flow of FIG. 2, the disclosed system accesses an entry in a category array determined by those answers. The category array has a number of dimensions dependent on the number of possible answers to the set of profiling questions. For example, the number of entries in the category array may equal the set of possible answer combinations to the profiling questions. In a case where the set of profiling questions for an implementation includes two questions, each of which may be answered by "True" or "False," the number of entries in the category array would be four. Such a category array 80 is shown for purposes of explanation in FIG. 3. The two questions in the set of profiling questions for the category array 80 of FIG. 3 are the questions associated with steps 70 and 72 of FIG. 2.

The category array 80 includes a first entry 82 associated with a category of configuration values that are the same for all users, and the same for all locations in the system under development. A second entry 84 is associated with a category of configuration values that are different for each user, but are the same for all location. The entry 86 is associated with a category of configuration values that are the same for each user, but are different for each location, and the entry 88 is associated with a category of configuration values that are the different for each user and different for each location. Each of the entries in the category array 80 of FIG. 3 are associated with one or more design guidelines to be provided to a user with regard to a POV data value that maps to that entry. For example, in the case where the POV data value is a configuration value, each of the entries in the category array 80 may be associated with a separate data store for storing configuration values, or with meta-data to identify different categories of configuration values stored within a shared data store. The four entry category array 80 of FIG. 3 is shown for purposes of illustration only, and an embodiment of the disclosed system may have a category array having any appropriate number of entries to reflect the specific set of profiling questions for that embodiment. In any event, after the user has answered the set of profiling questions, the POV data value in question is associated by the disclosed system with one and only one of the entries in the category array.

Figure 4:
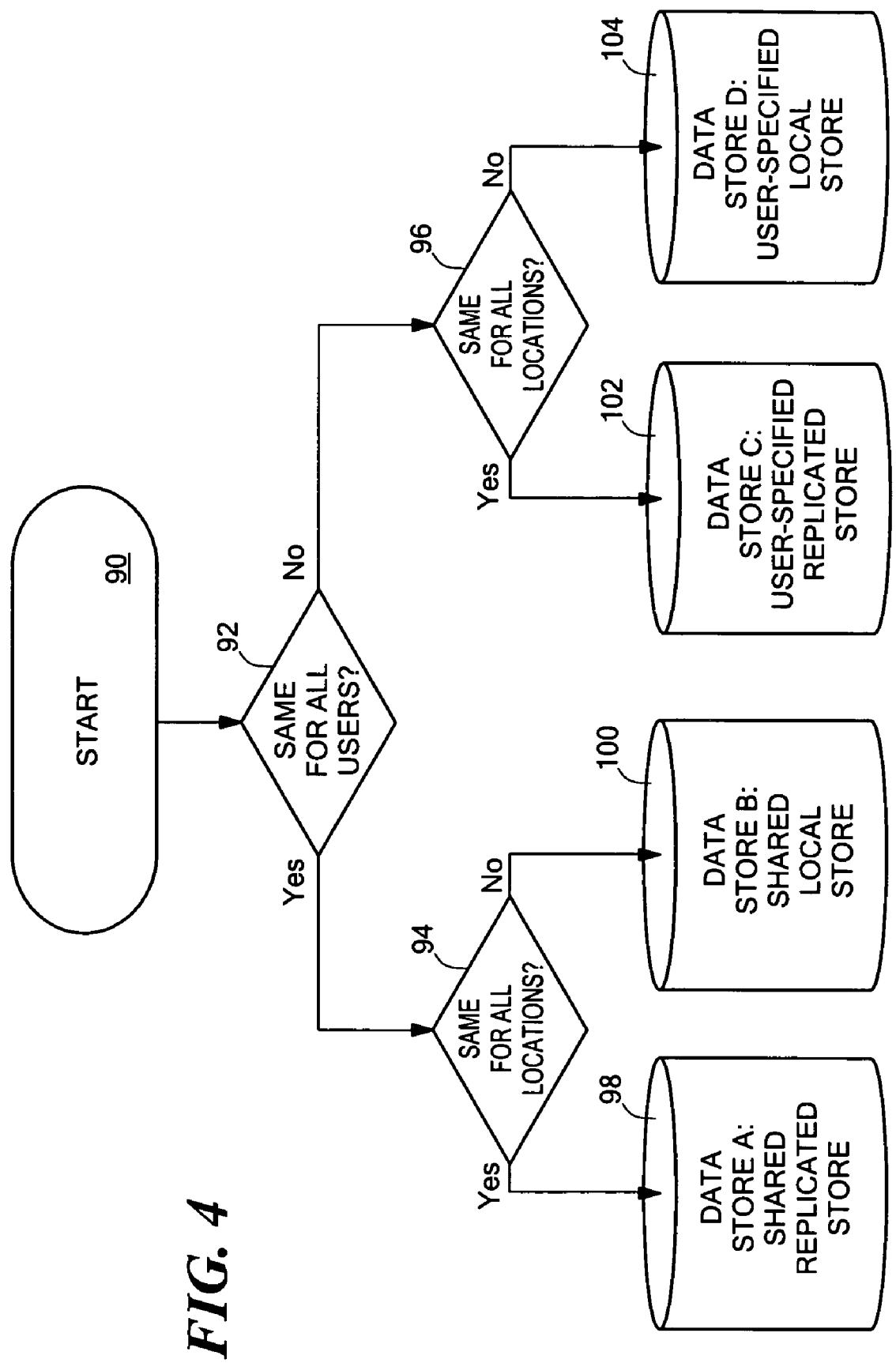
FIG. 4 is a flow chart diagram illustrating steps performed during operation of an embodiment of the disclosed system to determine an appropriate data store for a POV data value.

FIG. 4 is a flow chart illustrating steps performed by an embodiment of the disclosed system to process the answers to profiling questions. The flow of FIG. 4 is responsive to answers input to the disclosed system for the profiling questions 70 and 72 of FIG. 2. After starting at step 90, the disclosed system operates at step 92 to determine whether the POV data value is the same for all users of the system under development. If not, step 92 is followed by step 96, in which the disclosed system operates to determine whether the POV data value is the same for all locations at which the system is deployed. If not, then a branch of the flow terminates with a display of design guideline 104, consisting of an indication of a Data Store D: User-specific local store. If at step 96 the disclosed system determines that the POV data value is the same at all locations, then the branch of the flow terminates with a display of design guideline 102, consisting of an indication of Data Store C: User-specific replicated store.

If the disclosed system determines at step 92 that the POV data value is the same for all users, then step 92 is followed by step 94, in which the disclosed system operates to determine whether the POV data value is the same for all locations in which the system under development may be deployed. If not, then the flow terminates with a display of the design guideline 100, shown as an indication of the Data Store B: Shared local store. If at step 94 the disclosed system determines that the POV data value is the same for all locations, then the flow terminates with a display of the design guideline 98, shown as an indication of the Data Store A: Shared replicated store.

Thus the flow chart of FIG. 4 represents a flow of answers to the profiling questions of an embodiment of the disclosed system, and the terminating nodes of the flow chart in FIG. 4 represent respective entries within the category array. The disclosed system may operate to display the design guideline associated with the appropriate entry for an POV data value, or may operate to automatically associate the POV data value with the selected design guideline. Accordingly, in the illustrative embodiment, each design guideline associated with one of the terminating nodes of the flow chart in FIG. 4 may include either: 1) meta-data that is used to tag the POV data value, such as, for example an access control list, 2) an indication or name for a separate data store, and/or 3) code that may be output for use by the programmer.

Figure 5:
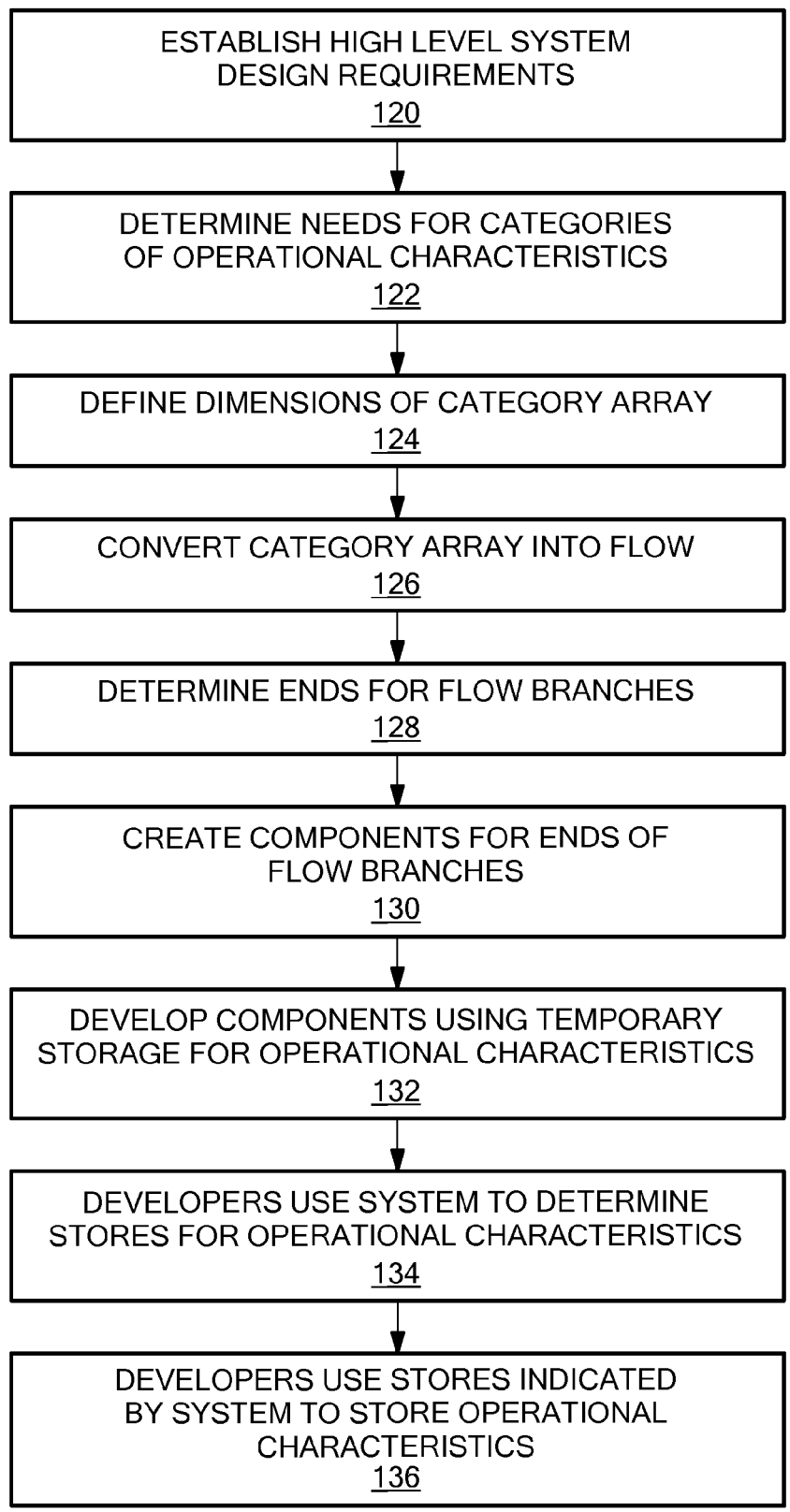
FIG. 5 is a flow chart illustrating steps performed to use an embodiment of the disclosed system during the software system development process.

FIG. 5 is a flow chart showing steps of a method for using an embodiment of the disclosed system in the process of developing a distributed software system. The process shown in FIG. 5 illustrates a preferred order of steps to be performed, and requires the users of the disclosed system to give explicit thought to the profiling questions, category array, and profiling flow, in order to insure maximum efficiency of designing and developing a configurable distributed system.

As shown in FIG. 5, at step 120, a technical leadership team for a software development project establishes high-level system design requirements for security, location distributivity, etc. At step 122, the technical leadership team uses the system design determined at step 120 to determine needs for different types of configuration data storage. At step 124, the technical leadership team defines the list of dimensions for the category array, and at step 126, re-tools the category array into a code flow representation. Next, at step 128, the technical leadership team "caps" the end of each code flow branch in the flow determined at step 126 with a node containing a design guideline, such as a description of where and how a configuration value matching the profile question answers represented by that flow branch should be stored. A configuration system development team then creates components at step 130 representing the data store indications in the design guidelines defined at step 128. These components created at step 130 are then usable by other developers to store configuration data in an appropriate place.

At step 132 developers develop their software components using temporary data storage locations for the necessary POV data values, in this case configuration values, such as text files, as "rough drafts" of such components, until the configuration system team finishes developing the configuration subsystem having the data stores associated with the design guidelines in the entries of the category array. When the developers are ready to integrate their components into the overall system being developed, they use the disclosed system to traverse the flow for each temporarily stored POV data value at step 134, and the displayed results of using the disclosed system for such a traversal informs them where and how to store the configuration value of interest at step 136.

Developers may also have a need for further division of configuration value storage, (i.e., for adding another dimension to the category array). In these cases, the developer approaches the configuration subsystem team to re-work the configuration design to meet their needs. Developers use the configuration systems provided to store their configuration data, and remove their "rough draft" storage code. The disclosed system, as illustrated in FIG. 5, thus assists developers in making important design decisions.

FIGS. 2, 4 and 5 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

I claim:

1. A method for acquiring and distributing information regarding architectural decisions to developers of a software system under development, comprising:

inputting a plurality of questions, wherein said plurality of questions reflect a system design of said software system under development, and wherein said plurality of questions include questions regarding whether a configuration value associated with a component of said software system under development is the same for all users of said software system under development;

generating a category array in response to said plurality of questions, wherein each element in said category array corresponds to a unique set of answers to said plurality of questions, and wherein each element in said category array contains a corresponding one of a plurality of design guidelines, each of said plurality of design guidelines indicating a name of a corresponding one of a plurality of data stores, wherein a first one of said elements in said category array corresponds to a first unique set of answers indicating that said configuration value is the same for all users of said software system under development and the same for all locations in which said software system under development may be deployed, wherein a second one of said elements of said category array corresponds to a second unique set of answers indicating that said configuration value is not the same for all users of said software system under development and not the same for all locations in which said software system under development may be deployed, wherein a third one of said elements in said category array corresponds to a third unique set of answers indicating that said configuration value is the same for all users of said software system under development and not the same for all locations in which said software system under development may be deployed, and wherein a fourth one of said elements in said category array corresponds to a fourth unique set of answers indicating that said configuration value is not the same for all users of said software system under development and the same for all locations in which said software system under development may be deployed;

inputting an operational characteristic of a component of said software system under development, wherein said operational characteristic is said configuration value associated with said component of said software system under development;

displaying said plurality of questions to at least one of said developers of said software system under development;

inputting answers to said plurality of questions from said at least one of said developers of said software system under development;

locating, responsive to said input answers and said category array, one of said plurality of design guidelines related to said operational characteristic, wherein said located one of said plurality of design guidelines is a name of a data store to be used to store said operational characteristic in said software system under development; and displaying said name of said data store to be used to store said operational characteristic to said at least one of said developers of said software system under development.

* * * * *